(12) United States Patent
Anandan et al.

(10) Patent No.: US 10,903,498 B2
(45) Date of Patent: Jan. 26, 2021

(54) HYBRID ELECTROLYTE DESIGN FOR LITHIUM TITANATE BASED LITHIUM ION BATTERY

(71) Applicant: FORD GLOBAL TECHNOLOGIES, LLC, Dearborn, MI (US)

(72) Inventors: Venkataramani Anandan, Farmington Hills, MI (US); Andrew Robert Drews, Ann Arbor, MI (US); Daniel Murray, Plymouth, MI (US); Matthew Denlinger, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/117,131

(22) Filed: Aug. 30, 2018

(65) Prior Publication Data
US 2020/0075959 A1    Mar. 5, 2020

(51) Int. Cl.
*H01M 4/62* (2006.01)
*H01M 10/0525* (2010.01)
*H01M 4/485* (2010.01)
*H01M 10/0565* (2010.01)
*H01M 10/0585* (2010.01)
*H01M 10/42* (2006.01)
*H01M 10/0562* (2010.01)

(52) U.S. Cl.
CPC ......... *H01M 4/628* (2013.01); *H01M 4/485* (2013.01); *H01M 10/0525* (2013.01); *H01M 10/0562* (2013.01); *H01M 10/0565* (2013.01); *H01M 10/0585* (2013.01); *H01M 10/4235* (2013.01); *H01M 2300/0071* (2013.01); *H01M 2300/0082* (2013.01); *H01M 2300/0085* (2013.01)

(58) Field of Classification Search
CPC .. H01M 4/628; H01M 4/485; H01M 10/0525; H01M 10/0562; H01M 10/0565; H01M 10/0585; H01M 10/4235; H01M 2300/0071; H01M 2300/0085; H01M 2300/0082
See application file for complete search history.

(56) References Cited

U.S. PATENT DOCUMENTS

| | | | |
|---|---|---|---|
| 9,893,337 B2 | 2/2018 | Pratt et al. | |
| 2011/0067230 A1* | 3/2011 | Tan | C01G 23/005 29/623.5 |
| 2017/0222262 A1 | 8/2017 | Kim et al. | |
| 2019/0089009 A1* | 3/2019 | Yoshima | H01M 10/38 |

* cited by examiner

*Primary Examiner* — Victoria H Lynch
(74) *Attorney, Agent, or Firm* — David B. Kelley; Brooks Kushman P.C.

(57) ABSTRACT

According to one or more embodiments, a lithium-ion battery includes an anode including lithium titanate (LTO) particles and solid electrolyte particles configured to form an interphase layer therebetween, a cathode including an active material, electronic conductor, and a non-solid electrolyte; and an ionically conductive and liquid-impermeable solid electrolyte separator. The solid electrolyte separator is in direct contact with and between the anode and cathode, and is configured to prevent reduction of the non-solid electrolyte by isolating the non-solid electrolyte from the LTO particles.

13 Claims, 2 Drawing Sheets

HYBRID ELECTROLYTE DESIGN FOR LITHIUM TITANATE BASED LITHIUM ION BATTERY

TECHNICAL FIELD

The present disclosure relates to a lithium-ion battery, and more particularly, components to reduce gassing in a lithium-ion battery.

BACKGROUND

Conventional lithium titanate (LTO) based lithium-ion batteries use liquid electrolytes. Under certain conditions, such as unusual voltage and temperature, liquid electrolytes in lithium titante (LTO) batteries can react at the interphase layer of the active materials to release heat and gas due to reduction of the liquid electrolyte. If the pressure inside the cell becomes too high, the gases may vent into the surrounding environment and potentially form a fuel-air mixture. The fuel-air mixture could be ignited by a spark or from the heat generated by the reaction between the electrolyte and the electrode materials. Furthermore, the 'gassing' when using liquid electrolytes deteriorates the power density and cycle stability of the battery. The rate and amount of gassing is affected by various parameters, including electrolyte solvent type, electrolyte solute type, traces of water in the electrolyte, temperature, and state of charge of the battery.

The main region where gassing occurs in a lithium-ion battery is at the LTO-electrolyte interphase layer. To address gassing issues, additives may be added to the electrolyte, such as, for example, flame retardants to reduce flammability. However, these additives may be costly and can significantly reduce the cell performance. In addition, some additives may not be chemically stable with active materials and may not function under some circumstances. In addition, although carbon or ceramic coatings on the LTO and organic additives to the electrolyte have been proposed to help reduce gassing at the interphase layer, the coatings and additives are typically ineffective at elevated temperature conditions.

SUMMARY

According to one or more embodiments, a lithium-ion battery includes an anode including lithium titanate (LTO) particles and solid electrolyte particles configured to form an interphase layer therebetween, a cathode including an active material, electronic conductor, and a non-solid electrolyte, and an ionically conductive and liquid-impermeable solid electrolyte separator. The solid electrolyte separator is in direct contact with and between the anode and cathode, and is configured to prevent reduction of the non-solid electrolyte by isolating the non-solid electrolyte from the LTO particles.

According to at least one embodiment, the solid electrolyte separator may be impermeable with respect to the non-solid electrolyte. In some embodiments, the anode may further include carbon. In one or more embodiments, the LTO material particles may be reduced LTO. In some embodiments, the solid electrolyte particles may be polymer electrolyte particles. In at least one embodiment, the solid electrolyte separator may be a polymer electrolyte separator. In yet other embodiments, the solid electrolyte particles and the solid electrolyte separator may be polymer electrolytes. In one or more embodiments, the non-solid electrolyte may be a liquid electrolyte. In other embodiments, the non-solid electrolyte may be a gel electrolyte.

According to one or more embodiments, a battery includes an ionically conductive and liquid impermeable solid electrolyte separator; and an anode and cathode on opposite sides of and in direct contact with the separator. The cathode includes a non-solid electrolyte, and the anode includes reduced lithium titanate particles and solid electrolyte particles configured to form an interphase layer therebetween. The separator is arranged to isolate the non-solid electrolyte from the interphase layer to prevent reduction of the non-solid electrolyte.

According to at least one embodiment, the solid electrolyte may be a polymer electrolyte. In one or more embodiments, the solid electrolyte may be an inorganic electrolyte. In some embodiments, the solid electrolyte separator may be a polymer electrolyte. According to one or more embodiments, the solid electrolyte separator may be impermeable with respect to the non-solid electrolyte. In certain embodiments, the non-solid electrolyte may be a liquid electrolyte.

According to one or more embodiments, a method of forming a lithium-ion battery comprises providing an anode having lithium titanate (LTO) particles and solid electrolyte particles configured to form an interphase layer therebetween, providing a cathode including a non-solid electrolyte, and preventing reduction of the non-solid electrolyte by isolating the non-solid electrolyte from the LTO particles by an ionically conductive and liquid-impermeable solid electrolyte separator in direct contact with and between the anode and cathode.

According to at least one embodiment, the solid electrolyte particles may be a polymer electrolyte. In one or more embodiments, the solid electrolyte particles and the solid electrolyte separator may be polymer electrolytes. In at least one embodiment, the non-solid electrolyte may be a liquid electrolyte. In certain embodiments, the solid electrolyte particles may be a sulfide or oxide.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to embodiments of the present disclosure, a hybrid battery cell is provided. The hybrid battery cell includes a cathode with a non-solid electrolyte, an anode with solid electrolyte, and a solid electrolyte separator therebetween. The solid electrolyte may be a polymer electrolyte or a polymer gel electrolyte. The solid electrolyte separator may be an inorganic, sulfide, or polymer solid electrolyte separator. The solid electrolyte separator is impermeable such that the non-solid electrolyte is isolated from and stays separate from the anode lithium titanate (LTO) material, thus preventing reduction of the non-solid electrolyte at the surface of the anode LTO material to reducing gassing in the cell.

Figure 1A:
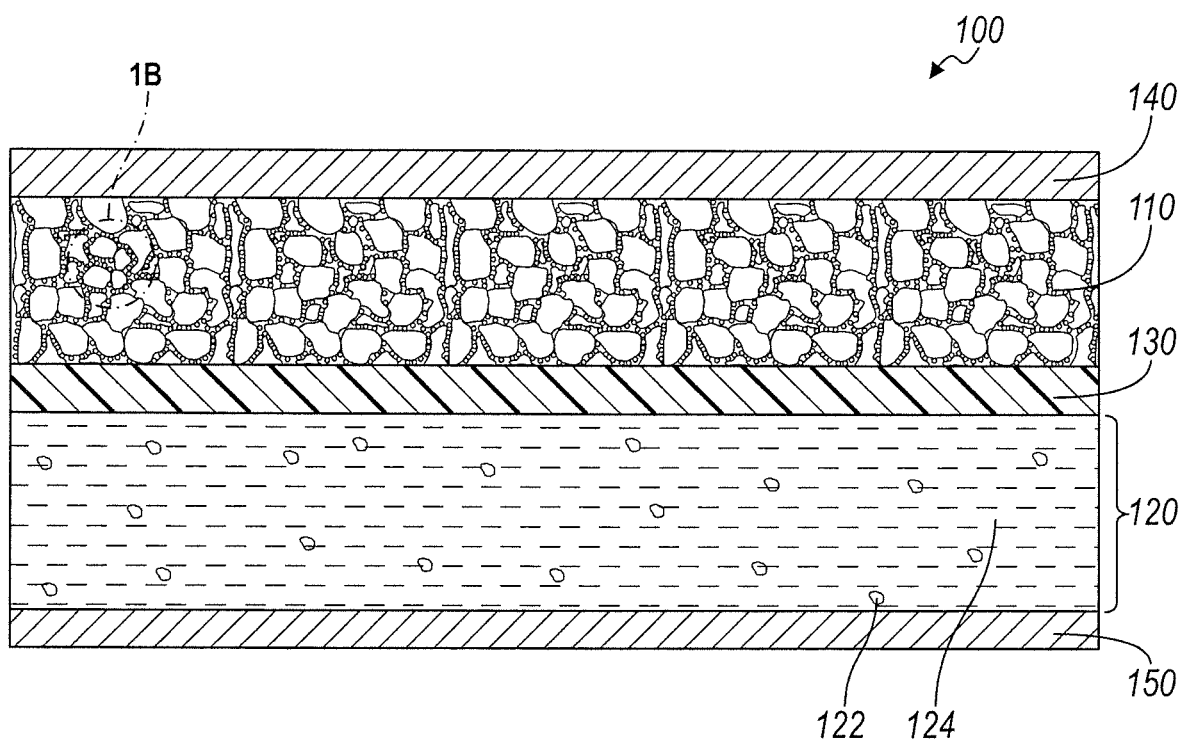
FIG. 1A is a schematic illustration of a cross-section of a hybrid battery cell design, according to an embodiment.
Figure 1B:
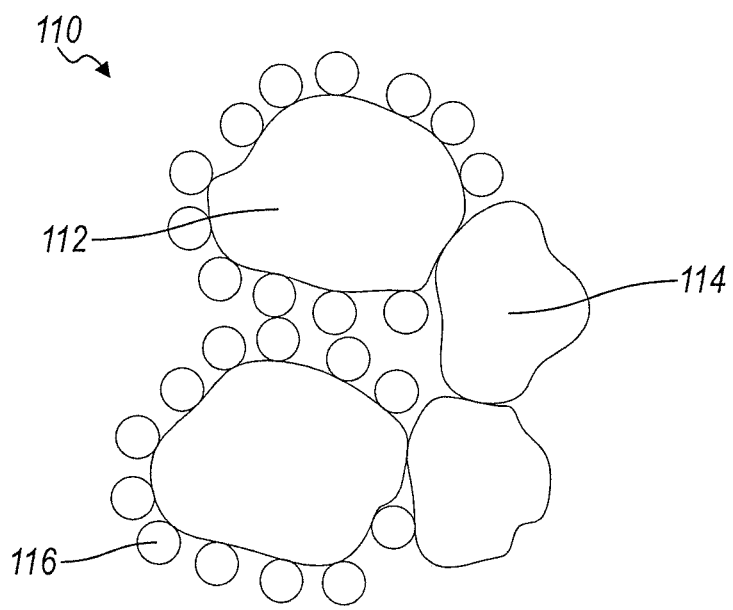
FIG. 1B is a schematic illustration of the anode of the hybrid battery cell design of FIG. 1A.

Referring to FIGS. 1A and 1B, a hybrid battery cell 100 is shown according to an embodiment. Hybrid battery cell 100 includes an anode 110 and a cathode 120, with a solid electrolyte separator 130 between the anode 110 and the cathode 120. Each of the anode 110 and cathode 120 includes a current collector 140, 150, respectively. In an embodiment, the anode 110 is a composite of lithium titanate (LTO) particles 112, solid electrolyte particles 114, and carbon particles 116. The solid electrolyte of the solid electrolyte separator 130 and the solid electrolyte particles 114 may be an inorganic solid electrolyte, a sulfide, a polymer electrolyte, or a combination thereof. The separator formed from any of the solid electrolyte materials should be dense enough to avoid permeation of non-solid electrolyte from cathode in contact with the anode particle surface. During cell operation, the LTO particles 112 form an interphase layer with the solid electrolyte particles 114 to conduct lithium ions.

The cathode 120 includes an active material 122 and an electrolyte 124. The cathode 120 may, in some embodiments, include carbon (not shown). The electrolyte 124 of the cathode 120 is a non-solid electrolyte such as, but not limited to, a liquid electrolyte, polymer electrolyte, or polymer gel electrolyte. In an embodiment, the liquid electrolyte may include a lithium salt and an organic solvent. Examples of lithium salts may include, but is not limited to, $LiPF_6$, $LiBF_4$, $LiClO_4$, or mixtures thereof. Suitable organic solvents may include, but is not limited to, ethylene carbonate (EC), dimethyl carbonate (DMC), ethyl methyl carbonate (EMC), diethyl carbonate (DEC), or mixtures thereof. However, any suitable lithium salt and organic solvent combination may be used.

During conventional cell operation, these non-solid electrolytes may permeate the separator and react with the active materials to cause gassing in the cell. The non-solid electrolyte 124 of cathode 120 is separated from the LTO 112 of the anode 110 by the solid electrolyte separator 130, which is impermeable with respect to the non-solid electrolyte 124. As such, according to one or more embodiments of the present disclosure, the LTO particles 112 are isolated from the non-solid electrolyte, and, thus, the reduction of the non-solid electrolyte is prevented. By preventing the reduction of the non-solid electrolyte at the LTO particles 112 surface, gassing is either eliminated or reduced in the hybrid battery cell 100. Therefore, the hybrid battery design allows for LTO based lithium ion batteries to be more suitable in high temperature environments, such as, for example, inside a car hood.

Figure 2A:
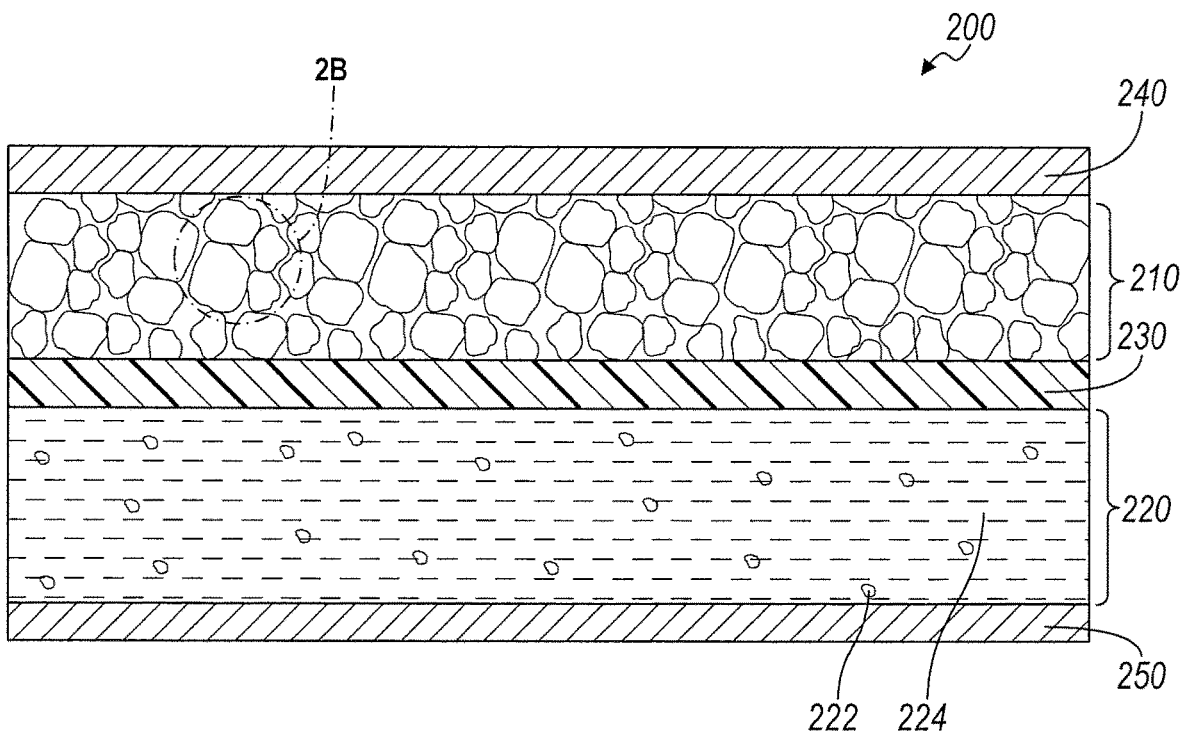
FIG. 2A is a schematic illustration of a cross-section of a hybrid battery cell design, according to another embodiment.
Figure 2B:
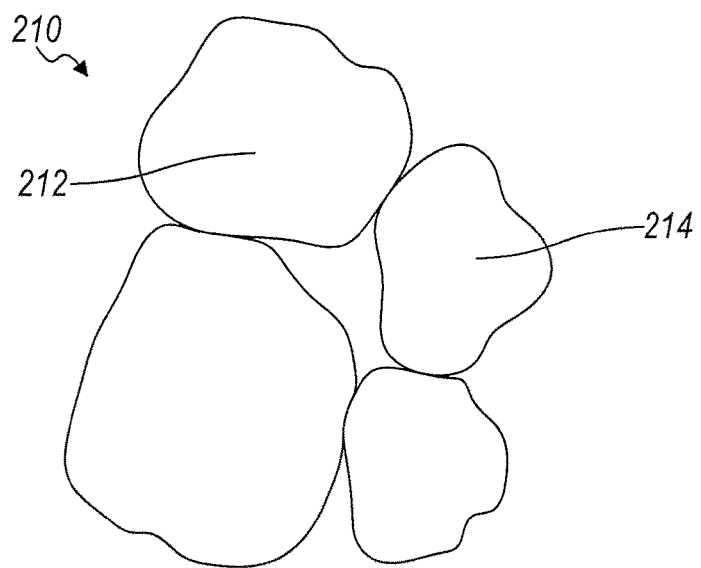
FIG. 2B is a schematic illustration of the anode of the hybrid battery cell design of FIG. 2A.

According to another embodiment, as shown in FIGS. 2A and 2B, a hybrid battery cell 200 is shown. Hybrid battery cell 200 includes an anode 210 and a cathode 220, with a solid electrolyte separator 230 between the anode 210 and the cathode 220. Each of the anode 210 and cathode 220 includes a current collector 240, 250, respectively. In an embodiment, the anode 210 is a composite of reduced LTO particles 212 and solid electrolyte particles 214. The solid electrolyte of the solid electrolyte separator 230 and the solid electrolyte particles 214 may be an inorganic solid electrolyte, a sulfide, a polymer electrolyte, or a combination thereof. The reduced LTO particles 212 of anode 210 have a high electronic conductivity, thus providing sufficient electronic conduction throughout the anode, without the need for additional components (e.g., carbon).

The cathode 220 includes an active material 222 and an electrolyte 224. The cathode 220 may, in some embodiments, include carbon (not shown). The electrolyte 224 of the cathode 220 is a non-solid electrolyte such as, but not limited to, a liquid electrolyte, polymer electrolyte, or polymer gel electrolyte. In an embodiment, the liquid electrolyte may include a lithium salt and an organic solvent, similar to the embodiment previously discussed.

During conventional cell operation similar to the above, non-solid electrolytes may permeate a conventional separator and react with the active materials at the interphase layer to cause gassing in the cell. The non-solid electrolyte 224 of cathode 220 is separated from the reduced LTO 212 of the anode 210 by the solid electrolyte separator 230, which is impermeable with respect to the non-solid electrolyte 224. As such, the reduced LTO particles 212 are isolated from the non-solid electrolyte, and, thus, the reduction of the non-solid electrolyte is prevented. By preventing the reduction of the non-solid electrolyte at the reduced LTO particles 212 surface, gassing is either eliminated or reduced in the hybrid battery cell 200.

In certain embodiments, to form a flexible hybrid cell, the hybrid cell may include a polymer electrolyte in both the anode as the solid electrolyte, and as the solid electrolyte separator.

According to embodiments of the present disclosure, a hybrid battery cell is provided. The hybrid battery cell includes a cathode with a non-solid electrolyte, an anode with a solid electrolyte, and an impermeable solid electrolyte separator therebetween. The solid electrolyte may be a polymer electrolyte or a polymer gel electrolyte. The solid electrolyte separator may be an inorganic, sulfide, or polymer solid electrolyte separator. The solid electrolyte separator is impermeable with respect to the non-solid electrolyte such that it is isolated from the anode active material, thus preventing reduction of the non-solid electrolyte at the surface of the active material, and reducing gassing in the cell.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lithium-ion battery comprising:
   an anode including a mixture of reduced lithium titanate (LTO) particles and solid electrolyte particles configured to form an interphase layer therebetween;
   a cathode including an active material, electronic conductor, and a liquid electrolyte; and
   an ionically conductive and liquid-impermeable solid electrolyte separator in direct contact with and between the anode and the cathode and configured to prevent reduction of the liquid electrolyte by isolating the liquid electrolyte from the reduced LTO particles such that the anode is constructed without gas absorbing features.

2. The lithium-ion battery of claim 1, wherein the anode further includes carbon.

3. The lithium-ion battery of claim 1, wherein the solid electrolyte particles are polymer electrolyte particles.

4. The lithium-ion battery of claim 1, wherein the solid electrolyte separator is a polymer electrolyte separator.

5. The lithium-ion battery of claim 1, wherein the solid electrolyte particles and the solid electrolyte separator are polymer electrolytes.

6. A battery comprising:
 an ionically conductive and liquid impermeable solid electrolyte separator; and
 an anode and cathode on opposite sides of and in direct contact with the separator, the cathode including a liquid electrolyte, the anode including reduced lithium titanate particles and solid electrolyte particles in a mixture, without gas absorbing additives, and configured to form an interphase layer therebetween, and the separator arranged to isolate the liquid electrolyte from the interphase layer to prevent reduction of the liquid electrolyte.

7. The battery of claim 6, wherein the solid electrolyte particles are polymer electrolyte particles.

8. The battery of claim 6, wherein the solid electrolyte is an inorganic electrolyte.

9. The battery of claim 6, wherein the solid electrolyte separator is a polymer electrolyte.

10. A method of forming a lithium-ion battery, the method comprising:
 providing an anode having a mixture of reduced lithium titanate (LTO) particles and solid electrolyte particles, without gas absorbing additives, the reduced LTO particles and solid electrolyte particles configured to form an interphase layer therebetween;
 providing a cathode including a liquid electrolyte; and
 preventing reduction of the liquid electrolyte by isolating the liquid electrolyte from the reduced LTO particles by an ionically conductive and liquid-impermeable solid electrolyte separator in direct contact with and between the anode and the cathode.

11. The method of claim 10, wherein the solid electrolyte particles are polymer electrolyte particles.

12. The method of claim 10, wherein the solid electrolyte particles and the solid electrolyte separator are polymer electrolytes.

13. The method of claim 10, wherein the solid electrolyte particles are a sulfide or oxide.

* * * * *